US012569953B2

(12) United States Patent
Oonishi

(10) Patent No.: US 12,569,953 B2
(45) Date of Patent: Mar. 10, 2026

(54) CONTROL DEVICE AND CONTROL METHOD FOR MACHINE TOOL

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 666 days.

(21) Appl. No.: 17/909,390

(22) PCT Filed: Mar. 5, 2021

(86) PCT No.: PCT/JP2021/008726
§ 371 (c)(1),
(2) Date: Sep. 5, 2022

(87) PCT Pub. No.: WO2021/177449
PCT Pub. Date: Sep. 10, 2021

(65) Prior Publication Data
US 2023/0098094 A1    Mar. 30, 2023

(30) Foreign Application Priority Data

Mar. 6, 2020    (JP) ................................ 2020-038327

(51) Int. Cl.
*B23Q 15/02*        (2006.01)
*B23Q 15/013*        (2006.01)
(Continued)

(52) U.S. Cl.
CPC ......... *B23Q 27/003* (2013.01); *B23Q 15/013* (2013.01); *B23Q 15/08* (2013.01)

(58) Field of Classification Search
CPC .. B23B 1/00; B23B 5/36; B23Q 27/00; B23Q 15/013
See application file for complete search history.

(56) References Cited

U.S. PATENT DOCUMENTS 4,538,945 A    9/1985  Gödecke et al.
4,651,599 A    3/1987  Ley
(Continued)

FOREIGN PATENT DOCUMENTS

CN        1054926 A    10/1991
CN      103009065 A     4/2013
(Continued)

OTHER PUBLICATIONS

Liu Feng et al., "A Continuous Machining Method of Turning Regular Polygon", Journal of Chinese Computer Systems, Feb. 2015, 381p-384p, vol. 36, No. 2, http://www.cnki.net, 4pp.
(Continued)

*Primary Examiner* — Alan Snyder
(74) *Attorney, Agent, or Firm* — HAUPTMAN HAM, LLP

(57)    ABSTRACT

Oscillation for a direct distance between the centers of a tool T and a workpiece W to meet $1+a \times l \times (1-\cos(M\omega t))$ and vertical oscillation to meet $a \times l \times \sin(M\omega t)$ are applied alone or in combination with time t, where $\omega$ denotes an angular velocity of a workpiece, M denotes the number of sides of a polygon, and a denotes an adjustment parameter. Such oscillation enables adjustment as to how the machining surface is made concave or convex.

4 Claims, 13 Drawing Sheets

POLYGON TURNING OF PRESENT INVENTION a × l

0

(51) Int. Cl.
    *B23Q 15/08*        (2006.01)
    *B23Q 27/00*        (2006.01)

(56) References Cited

U.S. PATENT DOCUMENTS

| | | | |
|---|---|---|---|
| 5,224,404 | A | 7/1993 | Kono et al. |
| 6,761,096 | B1 | 7/2004 | Kochsiek |
| 2006/0196324 | A1* | 9/2006 | Hayashi .................... B23B 5/36 |
| | | | 82/114 |
| 2016/0045959 | A1 | 2/2016 | Matsumaru |
| 2018/0257192 | A1 | 9/2018 | Nakaya et al. |

FOREIGN PATENT DOCUMENTS

| | | |
|---|---|---|
| CN | 105228777 A | 1/2016 |
| CN | 207057632 U | 3/2018 |
| DE | 911689 C1 | 5/1954 |
| DE | 3424494 A1 | 1/1986 |
| GB | 1395321 A | 5/1975 |
| JP | S5993212 A | 5/1984 |
| JP | S60501893 A | 11/1985 |
| JP | S6399114 A | 4/1988 |
| JP | H4164557 A | 6/1992 |
| JP | 2000512563 A | 9/2000 |
| JP | 201579348 A | 4/2015 |
| JP | 2018140482 A | 9/2018 |
| WO | 8802676 A1 | 4/1988 |
| WO | 2017051745 A1 | 3/2017 |

OTHER PUBLICATIONS

Hitoshi Amano, "NC lathe "NN-10SII" and polygon attachment", Machine and Tools, Apr. 1, 1999, vol. 43, No. 4, pp. 72-76, ISSN 0387-1053, 7pp.
Hitoshi Amano, "NC lathe "NN-10SII" and polygon attachment", Kikai to Kogu, Apr. 1, 1999, vol. 43, No. 4, pp. 72-76, ISSN 0387-1053, 7pp.
International Search Report in PCT/JP2021/008726, mailed May 25, 2021, 3pp.

* cited by examiner

CONVENTIONAL POLYGON TURNING

RELATIONSHIP BETWEEN DISTANCE BETWEEN CENTERS OF
TOOL AND WORKPIECE AND TOOL EDGE POSITION

CONVENTIONAL POLYGON TURNING

POLYGON TURNING WITH OSCILLATION IN X-AXIS DIRECTION a×l

FIG. 7

RELATIONSHIP BETWEEN DISPLACEMENT OF TOOL IN Y-AXIS
DIRECTION AND EDGE POSITION

CONVENTIONAL POLYGON TURNING

POLYGON TURNING OF PRESENT INVENTION a×l a=0.06 a=0.15 a=0.12

0 a=0.18

0

CONTROL DEVICE AND CONTROL METHOD FOR MACHINE TOOL

RELATED APPLICATIONS

The present application is a National Phase of International Application Number PCT/JP2021/008726, filed Mar. 5, 2021, and claims priority based on Japanese Patent Application No. 2020-038327, filed Mar. 6, 2020.

TECHNICAL FIELD

The present invention relates to a control device and a control method for a machine tool that performs polygon turning.

BACKGROUND ART

Conventionally, there has been polygon turning to process a workpiece into a shape of a polygon by rotating a tool and the workpiece at a constant ratio. In polygon turning, each tool edge draws an elliptical orbit about a workpiece. If the rotation ratio of a workpiece and a tool and the number of tools are changed, the phase or the number of ellipses changes, and accordingly, the workpiece can be processed into a polygon such as a quadrangle or a hexagon. FIG. 13A illustrates a motion path of a tool relative to a workpiece when the workpiece center is defined as the origin. In this example, the rotation ratio of the workpiece and the tool is 1:2, and the number of tools is two. The motion path of a tool T1 relative to the workpiece is orbit 1, and the motion path of a tool T2 relative to the workpiece is orbit 2. For one turn of the workpiece, the two tools T1 and T2 draw the elliptical orbit 1 and the elliptical orbit 2 around the workpiece, and a quadrangle is formed on the workpiece surface. FIG. 13B illustrates a case where the rotation ratio is 1:2 and the number of tools is three. In this case, the three tools draw elliptical orbits around a workpiece, and when the tools cut the workpiece along these orbits, a hexagon is formed on the workpiece surface.

Since polygon turning is to form a polygon by using a combination of ellipses, a resulted cut surface has a shallow curve. Thus, polygon turning is unsuitable for such high-precision machining that requires high flatness. The advantage of polygon turning is in a shorter machining time than is required for polygon turning using a milling machine or the like. Polygon turning is used for machining of a member that does not require high precision in practical use (such as a head of a bolt or a bit of a driver).

One of the methods for increasing the flatness in polygon turning is to increase the diameter of tools. However, the size of a tool mechanism is limited. Conventionally, as a technique to reduce the diameter of a tool body, a known technique is to provide a housing part for a cutting insert to a cutter body, house the cutting insert in the housing part, and adjust the position of the cutting insert by using a fixing bolt and a positioning bolt. For example, see Patent Literature 1.

Further, there is a technique to move a rotation shaft to process a workpiece into any shape. For example, in Patent Literature 2, a first spindle and a second spindle are rotated at different rotational rates, and the first spindle and the second spindle are shifted in a direction of a virtual straight line based on a phase difference for every first cycle to process the workpiece surface into any shape.

CITATION LIST

Patent Literature

Patent Literature 1: Japanese Patent Application Laid-Open No. 2018-140482
Patent Literature 2: Japanese Patent Application Laid-Open No. 2015-79348

SUMMARY OF INVENTION

Technical Problem

Although the size of a cutter body can be reduced in Patent Literature 1, tools protrude out of the cutter body, which does not mean that the tool diameter is reduced.

In Patent Literature 2, to process a workpiece into a desired shape, complex control is required such as motion of a first spindle and a second spindle in accordance with a phase difference between the spindles.

In the field of polygon turning, there is a demand for a technique to shape a machining surface without changing the machine tool mechanism.

Solution to Problem

One aspect of the present invention is a control device that controls polygon turning to form a polygon on a surface of a workpiece, the control device includes: a workpiece command generation unit that generates a command of an angular velocity of the workpiece; a tool command generation unit that generates a command of an angular velocity of a tool; and an oscillation generation unit that generates an oscillation component for oscillating a relative position between the workpiece and the tool.

Another aspect of the present invention is a control method for controlling polygon turning to form a polygon on a surface of a workpiece by rotating the workpiece and a tool simultaneously, control method includes: generating a command for an angular velocity of the workpiece; generating a command for an angular velocity of the tool; generating an oscillation component for oscillating a relative position between the workpiece and the tool; and performing control to rotate the workpiece and the tool at the generated angular velocities and oscillate the relative position between the workpiece and the tool.

Advantageous Effects of Invention

According to one aspect of the present invention, it is possible to shape a machining surface without changing the machine tool mechanism.

BRIEF DESCRIPTION OF DRAWINGS

FIG. 7 is a diagram illustrating oscillation of the tool in the Y-axis directions in the present disclosure.

DESCRIPTION OF EMBODIMENTS

Figure 1:
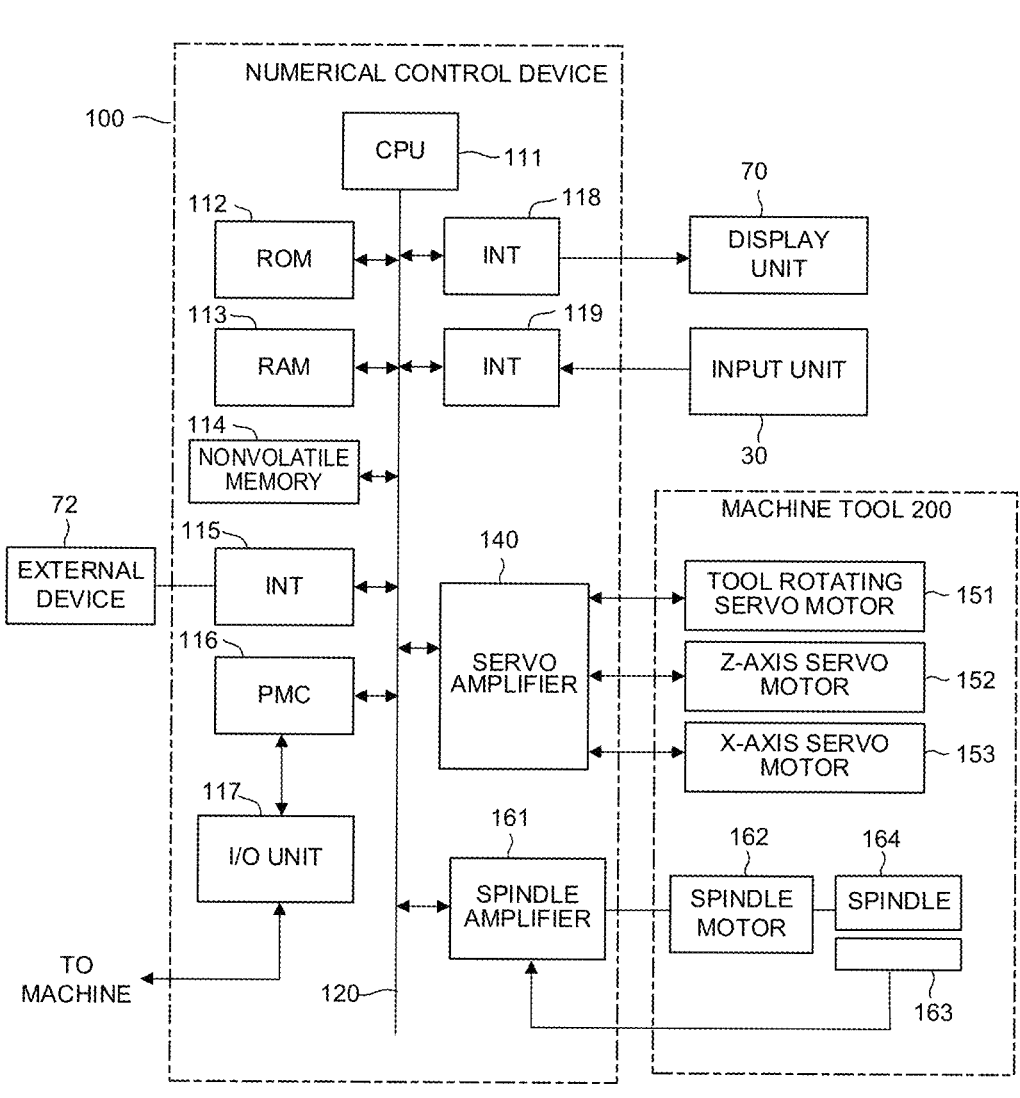
FIG. 1 is a hardware configuration diagram of a control device in the present disclosure.

An example of a control device 100 of the present disclosure will be illustrated below. As illustrated in FIG. 1, the control device 100 includes a CPU 111 that controls the overall control device 100, a ROM 112 that stores a program or data, and a RAM 113 into which data is temporarily loaded, and the CPU 111 reads a system program stored in the ROM 112 via a bus 120 and controls the overall control device 100 in accordance with the system program.

A nonvolatile memory 114 is backed up or the like by a battery (not illustrated), for example, and the storage state is maintained even when the control device 100 is powered off. The nonvolatile memory 114 stores a program loaded from an external device 72 via an interface 115, 118, or 119 or various data acquired from a user operation input via an input unit 30 or acquired from each unit of the control device 100, a machine tool 200, or the like (for example, a setting parameter, sensor information, or the like).

The interface 115 is an interface for connecting the control device 100 and the external device 72 such as an adaptor to each other. A program, various parameters, or the like are loaded from the external device 72 side. Further, a program, various parameters, or the like modified in the control device 100 can be stored in an external storage unit via the external device 72. A programmable machine control (PMC) 116 performs input and output of a signal with the machine tool 200, a robot, and a device such as a sensor attached to the machine tool 200 or the robot via an I/O unit 117 and thereby controls the same by using a sequence program built in the control device 100.

On a display unit 70, an operation screen of the machine tool 200, a display screen indicating the operation status of the machine tool 200, or the like are displayed. The input unit 30 is formed of an MDI, an operation panel, a touch panel, or the like and passes operation input made by a worker to the CPU 111.

A servo amplifier 140 controls respective shafts of the machine tool 200. The servo amplifier 140 drives a servo motor in response to receiving a command about the amount of shaft motion from the CPU 111. The machine tool 200 includes at least a tool rotating servo motor 151, a Z-axis servo motor 152, and an X-axis servo motor 153 (or a Y-axis servo motor 154). The tool rotating servo motor 151, the Z-axis servo motor 152, and the X-axis servo motor 153 (or the Y-axis servo motor 154) each have a built-in position/speed detector and feed a position/speed feedback signal from the position/speed detector back to the servo amplifier 140 to perform feedback control of the position/speed.

The control device 100 sets a virtual coordinate system in the machine tool 200. In the following description, the center axis of a workpiece W is defined as the Z-axis, an axis connecting the workpiece center to a tool center is defined as an X-axis, and an axis orthogonal to the X-axis is a Y-axis.

The machine tool 200 of the present disclosure includes at least the tool rotating servo motor 151 that rotates a tool T (tool shaft), the Z-axis servo motor 152 that moves a cutter holder (hereafter, referred to as the tool T) in the Z-axis directions, and the X-axis servo motor 153 that moves the tool T in the X-axis directions.

A spindle amplifier 161 drives a spindle motor 162 in response to receiving a spindle rotation command for a spindle 164 of the machine tool 200. The power of the spindle motor 162 is transmitted to the spindle 164 via a gear, and the spindle 164 rotates at an instructed rotational rate. A position coder 163 is coupled to the spindle 164, the position coder 163 outputs feedback pulses in synchronization with the spindle 164, and the feedback pulses are read by the CPU 111.

The workpiece W is attached to the spindle 164. The axis directions of the spindle 164 and the tool shaft are parallel, and the spindle 164 and the tool shaft rotate at a predetermined rotation ratio. When the spindle 164 and the tool shaft rotate simultaneously, the tool T attached to the tool shaft cuts the workpiece surface, and a polygon is formed on the workpiece surface.

Figure 2:
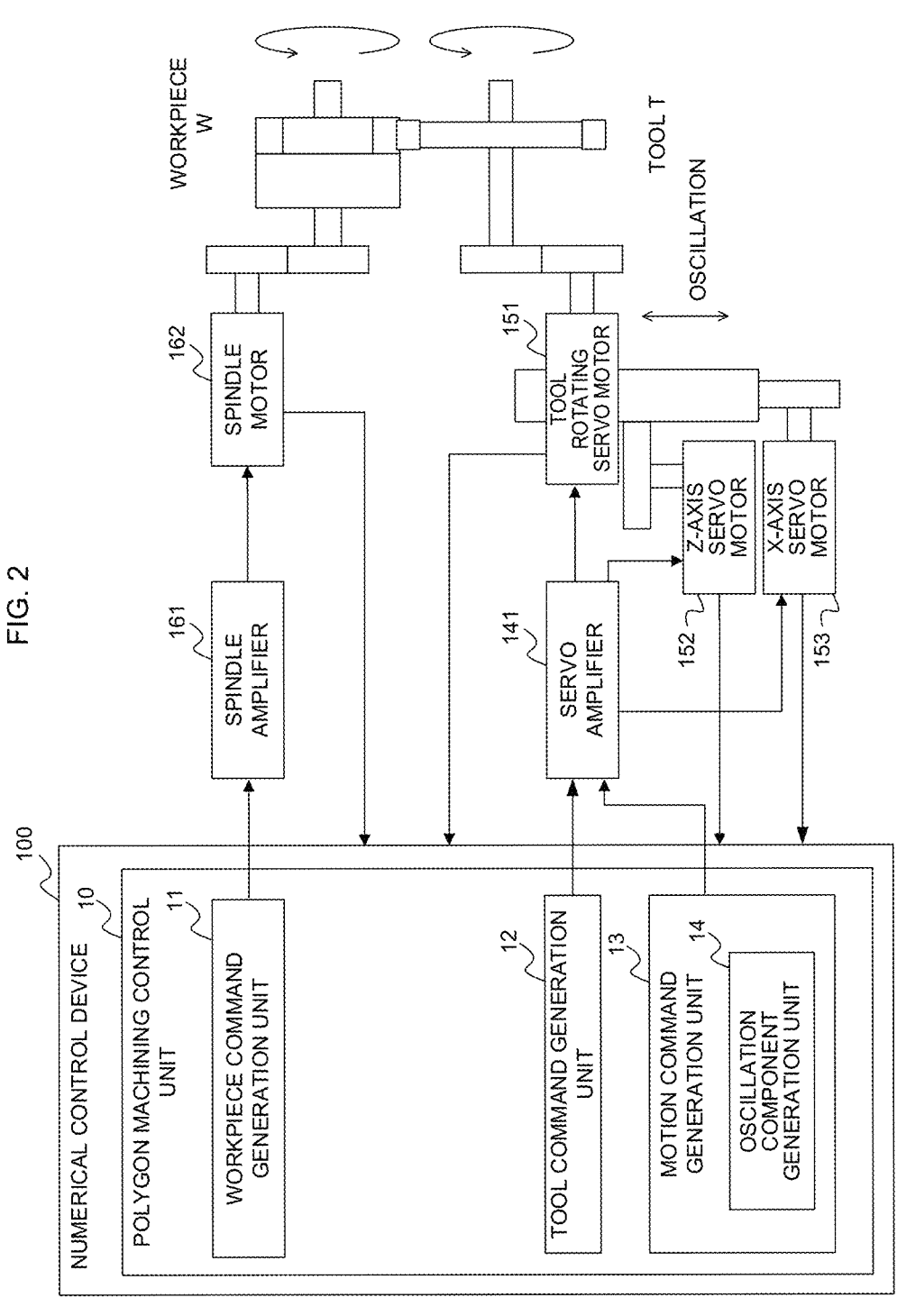
FIG. 2 is a block diagram of a control device that oscillates a tool in the X-axis directions.

FIG. 2 is a block diagram of the control device 100 having an adjustment function of polygon turning. The function in the block diagram is implemented when the CPU 111 executes a program stored in a storage device such as the ROM 112.

The control device 100 includes a polygon turning control unit 10. The polygon turning control unit 10 includes a workpiece command generation unit 11 that generates a rotation command for the workpiece shaft, a tool command generation unit 12 that generates a rotation command for the tool shaft, and a motion command generation unit 13 that generates a motion command for the tool T.

The workpiece command generation unit 11 generates a rotation command for the spindle 164. The workpiece command generation unit 11 generates a command to rotate the spindle 164 at a constant angular velocity $\omega$ and outputs the command to the spindle amplifier 161. The spindle amplifier 161 controls the spindle motor 162 in accordance with the command from the workpiece command generation unit 11. The spindle motor 162 rotates the spindle 164 at a constant angular velocity $\omega$. Accordingly, the workpiece W attached to the spindle 164 rotates at the constant angular velocity $\omega$.

The tool command generation unit 12 generates a rotation command for the tool T. The tool command generation unit 12 generates a command to rotate the tool T at a constant angular velocity and outputs the command to the servo amplifier 140. The servo amplifier 140 controls the tool rotating servo motor 151 in accordance with the command from the tool command generation unit 12. The tool rotating servo motor 151 rotates the tool T at the constant angular velocity in accordance with the control of the servo amplifier 140. The angular velocity of the tool T is determined by the rotation ratio between the workpiece W and the tool T, and the angular velocity of the tool T is 2ω in an example described later.

The motion command generation unit 13 generates a motion command for the tool T. The motion command is for synchronization control of motion in the Z-axis directions and motion in the X-axis directions of the tool T. The command in the Z-axis directions is a feed command. The Z-axis servo motor 152 moves the tool T at a feed speed instructed from the motion command generation unit 13.

An oscillation component generation unit 14 generates an oscillation component in the X-axis directions of the tool T. The X-axis servo motor 153 oscillates the tool T in the X-axis directions in accordance with the oscillation command generated by the oscillation component generation unit 14. The control device 100 of the present disclosure oscillates the tool T in the X-axis directions to change the relative distance between the workpiece W and the tool T in the X-axis directions and adjust the flatness of a machining surface.

The polygon turning of the present disclosure will be described below in comparison with the conventional polygon turning.

Conventional Polygon Turning

First, the conventional polygon turning will be described.

In the conventional polygon turning, the angular velocities of the tool shaft and the workpiece shaft are constant. In the following description, the rotation ratio between the workpiece shaft and the tool shaft is 1:2. That is, when the angular velocity of the workpiece shaft is ω, the angular velocity of the tool shaft is twice, namely, 2ω. When two tools t1 and t2 are attached at a rotation ratio of 1:2, the two tools t1 and t2 each cut the workpiece surface twice for one turn of the workpiece W, and a quadrangle is formed on the workpiece surface. Note that, if the number of tools T is increased to three, the three tools each cut the workpiece surface twice for one turn of the workpiece W, and a hexagon is formed on the workpiece surface.

Figure 3:
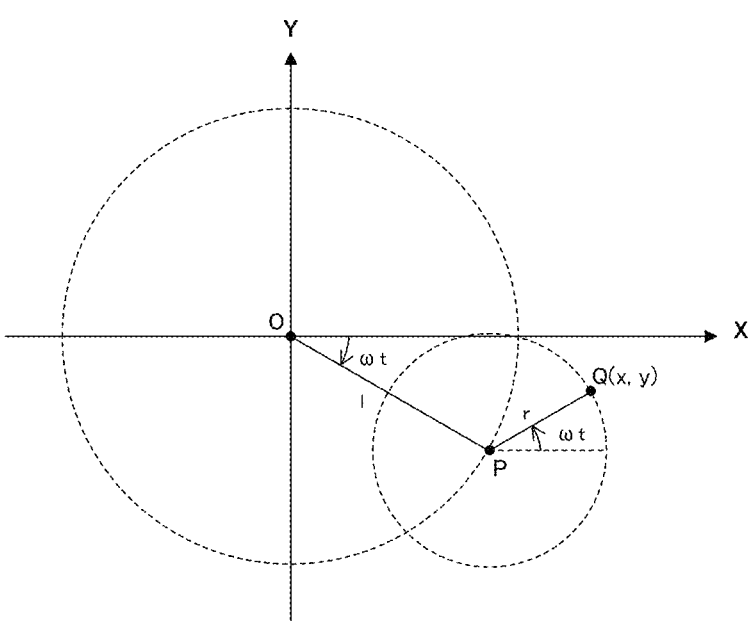
FIG. 3 is a diagram illustrating conventional polygon turning.

The orbit of a tool edge on the XY orthogonal coordinate system fixed to the workpiece W will be described with reference to FIG. 3. The origin O is the workpiece center. The distance between the centers of the workpiece W and the tool T is denoted as l, and the workpiece radius is denoted as r. When the workpiece W rotates clockwise at an angular velocity ω, the center P of the tool T moves at the angular velocity ω on a circumference of the radius l about the point O. Since the tool T rotates counterclockwise at an angular velocity ω (tool angular velocity 2ω−workpiece angular velocity ω), the position Q (x, y) of the tool edge relative to the workpiece center changes with time t as follows.

$$x = l \cos(-\omega t) + r \cos(\omega t)$$

$$y = l \sin(-\omega t) + r \sin(\omega t) \qquad \text{[Math. 1]}$$

Furthermore, when the tool number is denoted as n (=1, . . . , N; N is the number of tools), since the phase of each tool is shifted by 2π/n, the locus of each tool is as follows.

$$x_n = l\cos(\omega t) + r\cos\left(\omega t + \frac{2\pi}{n}\right) \qquad \text{[Math. 2]}$$

$$y_n = -l\sin(\omega t) + r\sin\left(\omega t + \frac{2\pi}{n}\right)$$

Since the number of tools T is two, the loci (x1, y1) and (X2, y2) of the tool t1 and the tool t2 are as follows, respectively.

$$x_1 = l \cos (\omega t) + r \cos (\omega t)$$

$$y_1 = -l \sin (\omega t) + r \sin (\omega t)$$

$$x_2 = l \cos (\omega t) + r \cos (\omega t + \pi)$$

$$y_2 = -l \sin (\omega t) + r \sin (\omega t + \pi) \qquad \text{[Math. 3]}$$

First Disclosure: Oscillation in X-Axis Direction

In the present disclosure, both or any one of the tool shaft and the workpiece shaft is oscillated along the Z-axis. Accordingly, the relative distance between the tool and the workpiece (the distance between the centers of the tool and the workpiece) increases or decreases, and the flatness of the workpiece surface (machining surface) can be adjusted. When the oscillation component in the Z-axis directions is expressed by an equation, the equation will be a×l×(1−cos (Mωt)). The value M denotes the number of sides of the polygon, and the oscillation component oscillates at a frequency of a multiple of the number of sides of the workpiece W. The value a is an adjustment parameter. An increase or decrease of the adjustment parameter a changes how the machining surface is made concave or convex, as described later. When a flat machining surface is desired, an adjustment parameter a which eliminates concave and convex is selected.

Figure 4:
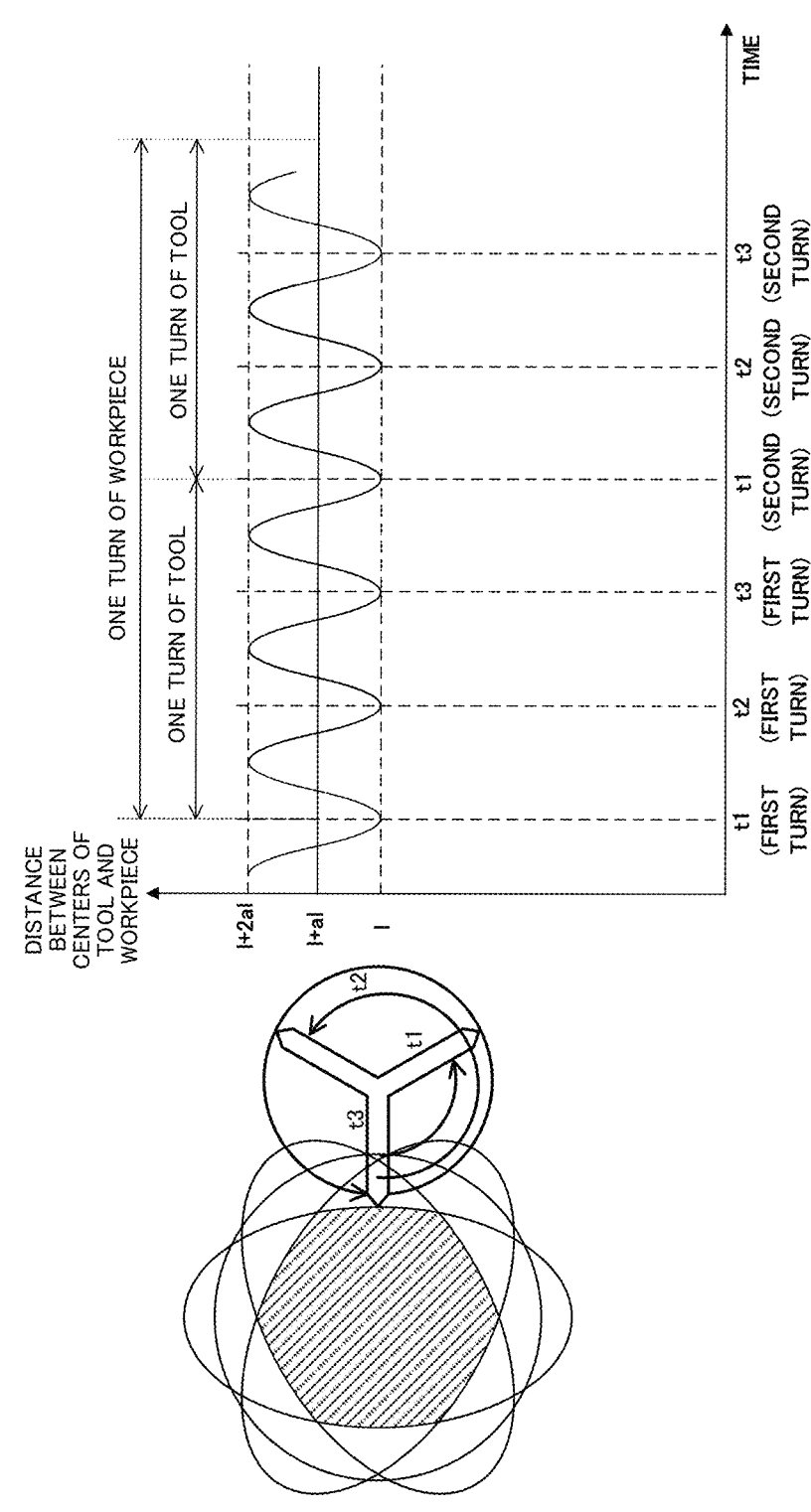
FIG. 4 is a diagram illustrating oscillation of a tool in the X-axis directions in the present disclosure.

The relationship between the oscillation component and the motion in the X-axis directions of the tool T will be illustrated with reference to FIG. 4. In FIG. 4, three tools t1, t2, and t3 are attached to a tool body. Further, the workpiece W and the tool T rotate at a rotation ratio of 1:2, and the three tools t1, t2, and t3 each cut the surface of the workpiece W twice for one turn of the workpiece W to form a hexagon. The distance between each center of the tools t1, t2, and t3 and the center of the workpiece W oscillates within a range of l to l+2×a×l with the minimum of l, as illustrated in FIG. 4. The oscillation frequency of the oscillation component is a product of the rotation frequency of the workpiece W and the number of sides, and the oscillation component oscillates for six times for one turn of the workpiece W. The phase of the oscillation component is adjusted so as to be the minimum when each of the tools t1, t2, and t3 reaches the center of the machining surface. That is, at the point of time when each of the tools t1, t2, and t3 reaches the center of the machining surface, the distance between the center of the workpiece W and each center of the tools t1, t2, and t3 is l.

Typically, since the rotation ratio between the workpiece W and the tool is 1:2, if the number of tools T is N, the number of sides of the workpiece W will be M=2N. When the tool shaft is oscillated with an amplitude of a×l, the distance between the centers changes by l×(1+a×(1−cos (2Nωt))). When the workpiece center is defined as the origin O on the XY orthogonal coordinate system and the position of the tool edge is expressed by an equation, the equation will be as follows.

$$x_n = l(1 + a(1 - \cos(2N\omega t)))\cos(\omega t) + r\sin\left(\omega t + \frac{2\pi}{n}\right) \quad \text{[Math. 4]}$$

$$y_n = -l(1 + a(1 - \cos(2N\omega t)))\sin(\omega t) + r\sin\left(\omega t + \frac{2\pi}{n}\right)$$

When the number of tools T is two, the loci (x1, y1) and (x2, Y2) of the tool t1 and the tool t2 are as follows, respectively.

$$x_1 = l(1 + a(1 - \cos(2N\omega t)))\cos(\omega t) + r\cos(\omega t)$$

$$y_1 = -l(1 + a(1 - \cos(2N\omega t)))\sin(\omega t) + r\sin(\omega t)$$

$$x_2 = l(1 + a(1 - \cos(2N\omega t)))\cos(\omega t) + r\cos(\omega t + \pi)$$

$$y_2 = -l(1 + a(1 - \cos(2N\omega t)))\sin(\omega t) + r\sin(\omega t + \pi) \quad \text{[Math. 5]}$$

Figure 5A:
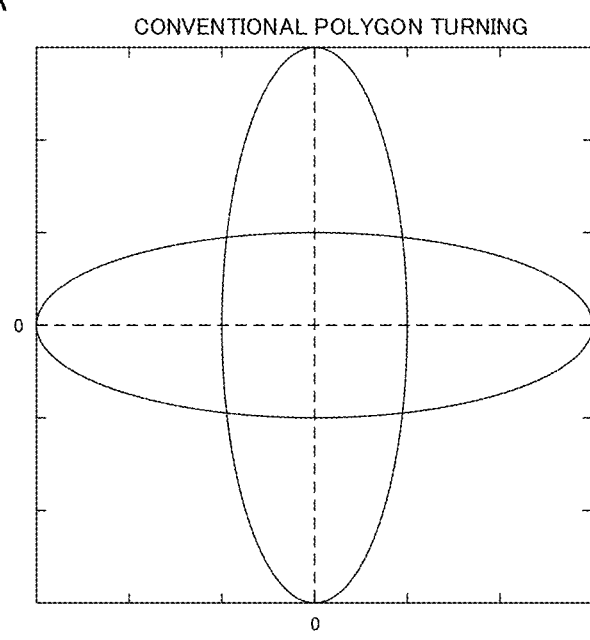
FIG. 5A is a diagram illustrating the flatness of a machining surface with conventional polygon turning.
Figure 5B:
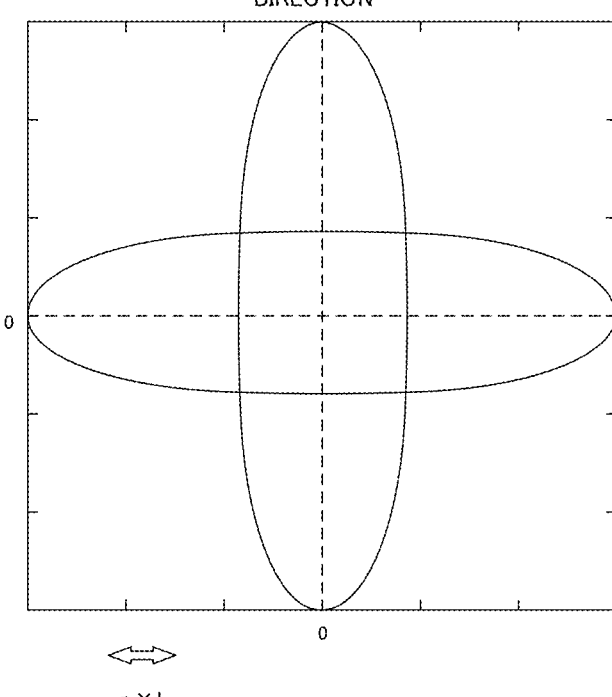
FIG. 5B is a diagram illustrating a change in the flatness of the machining surface caused by oscillation in the X-axis directions.

The graphs illustrated in FIGS. 5A and 5B represent results when the above equation is calculated assuming that N=2, l=10, r=5, a=0.03, and ω=20,π/3 (=200 rpm). It can be seen that the flatness of the machining surface of a quadrangle is improved in the polygon turning of the present disclosure (FIG. 5B) compared to the conventional polygon turning (FIG. 5A). The flatness of the machining surface can be changed by adjustment of the value of the adjustment parameter a. The adjustment parameter a may be set manually by an engineer, or the maximum value which does not make the machining surface concave may be derived from numerical analysis.

Second Disclosure: Oscillation in Y-Axis Direction

Next, oscillation in the Y-axis directions will be described.

It is also possible to adjust the flatness of the workpiece surface (machining surface) by oscillating the tool shaft along the Y-axis and increasing and decreasing the relative distance between the tool and the workpiece. The control device 100 of FIG. 6 has the Y-axis servo motor 154 and oscillates the tool T (specifically, a cutter holder to which the tool T is attached) in the Y-axis directions.

Figure 6:
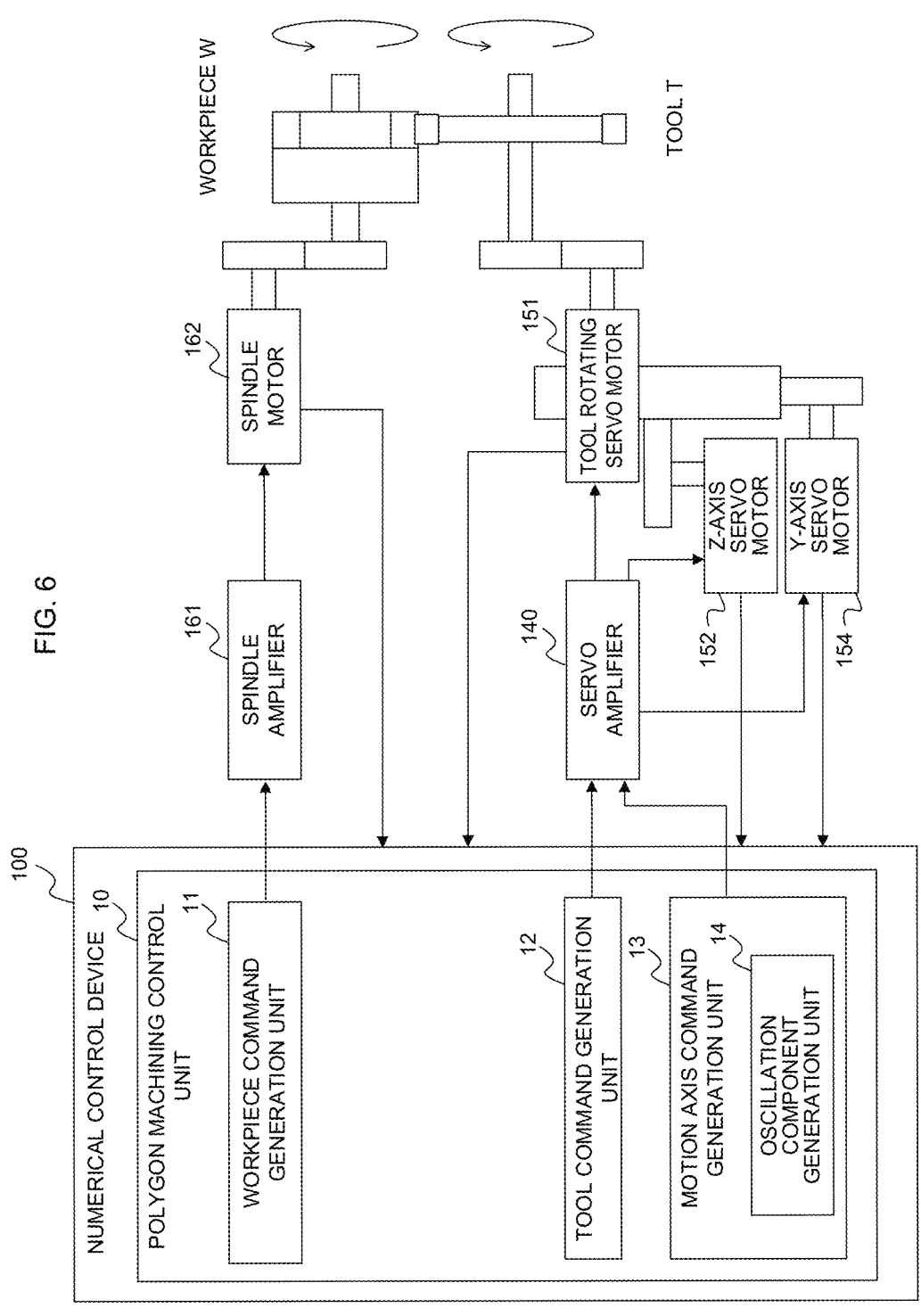
FIG. 6 is a block diagram of a control device that oscillates a tool in the Y-axis directions.

Note that, in the control device 100 of FIG. 6, since the workpiece command generation unit 11, the tool command generation unit 12, the spindle amplifier 161, the spindle motor 162, the servo amplifier 140, the tool rotating servo motor 151, and the Z-axis servo motor 152 are the same as those of the control device 100 of FIG. 2, the description thereof will be omitted.

The motion command generation unit 13 includes the oscillation component generation unit 14. The oscillation component generation unit 14 generates a component for oscillating the tool T in the Y-axis directions. The Y-axis servo motor 154 oscillates the tool T in the Y-axis directions in accordance with the oscillation command generated by the oscillation component generation unit 14. The control device 100 of the present disclosure adjusts the flatness of the machining surface by oscillating the tool T in the Y-axis directions to change the relative distance in the Y-axis directions between the workpiece W and the tool T.

The oscillation component is a×l×sin (Mωt). The value M is the number of sides of a polygon, and the oscillation component oscillates at a frequency of a multiple of the number of sides of the workpiece W. The value a is the adjustment parameter. An increase or decrease of the adjustment parameter a changes how the machining surface is made concave or convex, as described later. When a flat machining surface is desired, an adjustment parameter a which eliminates concave and convex is selected.

Figure 7:
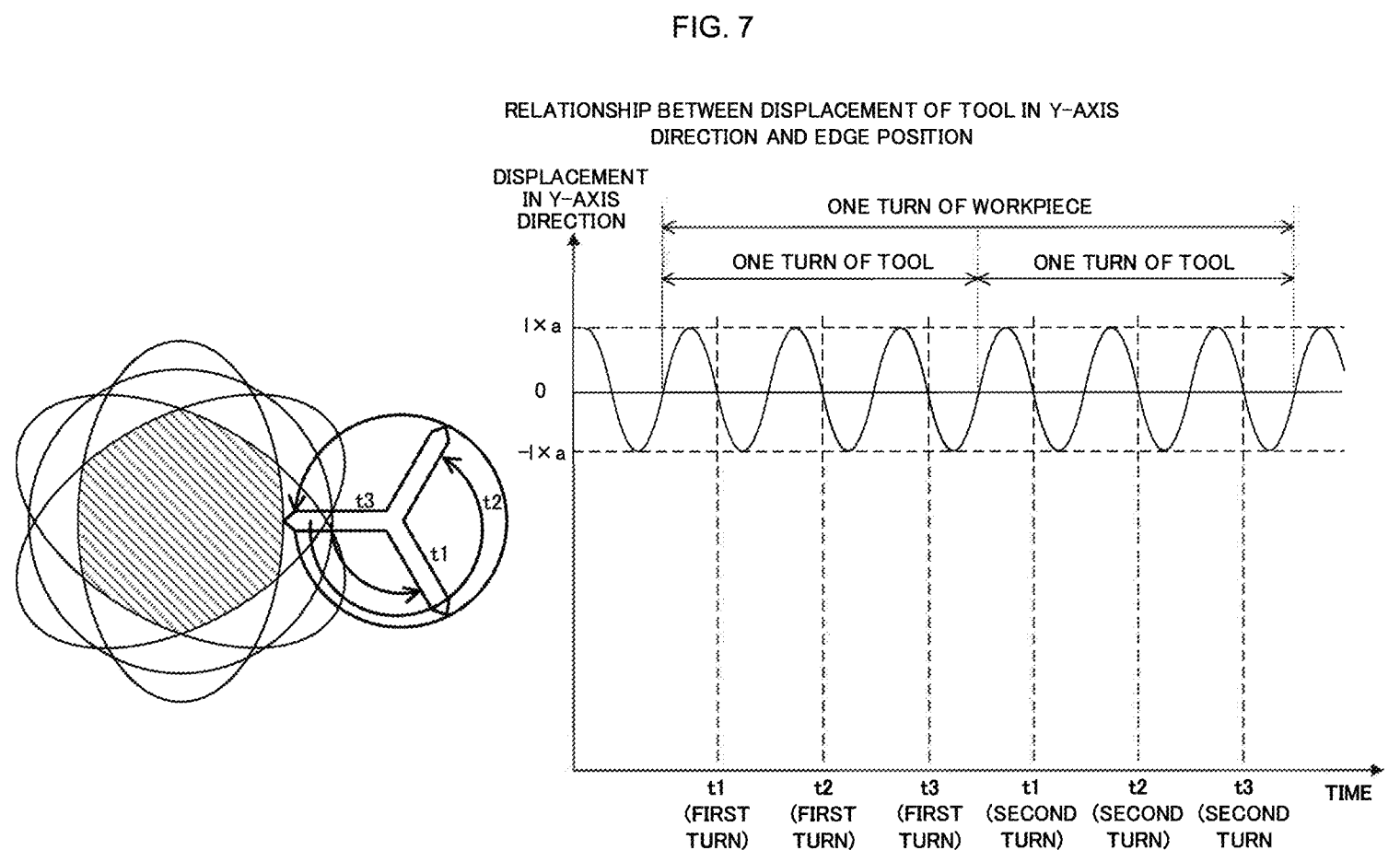

The relationship between the oscillation component and the motion in the Y-axis directions of the tool T will be illustrated with reference to FIG. 7. In FIG. 7, three tools t1, t2, and t3 are attached to a tool body. Further, the workpiece W and the tool T rotate at a rotation ratio of 1:2. The Y-axis component of the tool T oscillates with an amplitude of l×a about the Y-axis component of the workpiece center O. Further, when the tool t1 reaches the machining surface center, the displacement in the Y-axis directions is 0. Similarly, when the tool t2 and the tool t3 reach the machining surface, respectively, the displacement in the Y-axis directions is 0.

The locus of the tool edge Q(x, y) where the center of the workpiece W is defined as the origin O on the XY orthogonal coordinate system can be calculated as follows.

Figure 8:
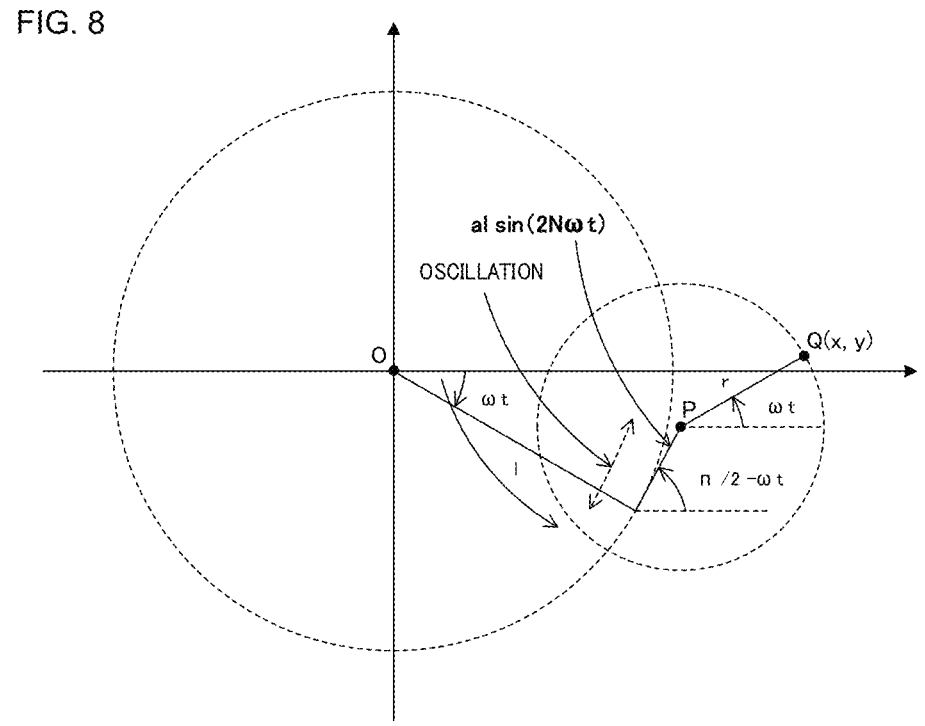
FIG. 8 is a diagram illustrating the position of a tool edge when the tool is oscillated in the Y-axis directions.

As illustrated in FIG. 8, the center position P of the tool T before the oscillation is started is (l×cos(ωt), −l×sin(ωt)). Once the tool T is oscillated in the Y-axis directions, the center P of the tool T oscillates with a×l×sin(2Nωt) in the tangent directions of the workpiece W. When the oscillation component is taken into consideration, the center position Q of the tool T is as follows.

$$\left(l\cos(\omega t) + al\sin(2N\omega t)\cos\left(\frac{\pi}{2} - \omega t\right),\right. \quad \text{[Math. 6]}$$

$$\left.-l\sin(\omega t) + al(2N\omega t)\sin\left(\frac{\pi}{2} - \omega t\right)\right)$$

Since the tool edge rotates at the angular velocity ω (tool angular velocity 2ω–workpiece angular velocity ω) about the tool center Q, the locus of the tool edge is as follows.

$$x_n = l(\cos(\omega t) + a\sin(2N\omega t)\sin(\omega t)) + r\cos\left(\omega t + \frac{2\pi}{n}\right) \quad \text{[Math. 7]}$$

$$y_n = -l(\sin(\omega t) - a\sin(2N\omega t)\cos(\omega t)) + r\sin\left(\omega t + \frac{2\pi}{n}\right)$$

When the number of tools T is two, the loci (x1, y1) and (x2, y2) of the tool t1 and the tool t2 are as follows, respectively.

$$x_1 = l(\cos(\omega t) + a\sin(2N\omega t)\sin(\omega t)) + r\cos(\omega t + 2\pi)$$

$$y_1 = -l(\sin(\omega t) - a\sin(2N\omega t)\cos(\omega t)) + r\sin(\omega t + 2\pi)$$

$$x_2 = l(\cos(\omega t) + a\sin(2N\omega t)\sin(\omega t)) + r\cos(\omega t + \pi)$$

$$y_2 = -l(\sin(\omega t) - a\sin(2N\omega t)\cos(\omega t)) + r\sin(\omega t + \pi) \quad \text{[Math. 8]}$$

Figures 9A, 9B:
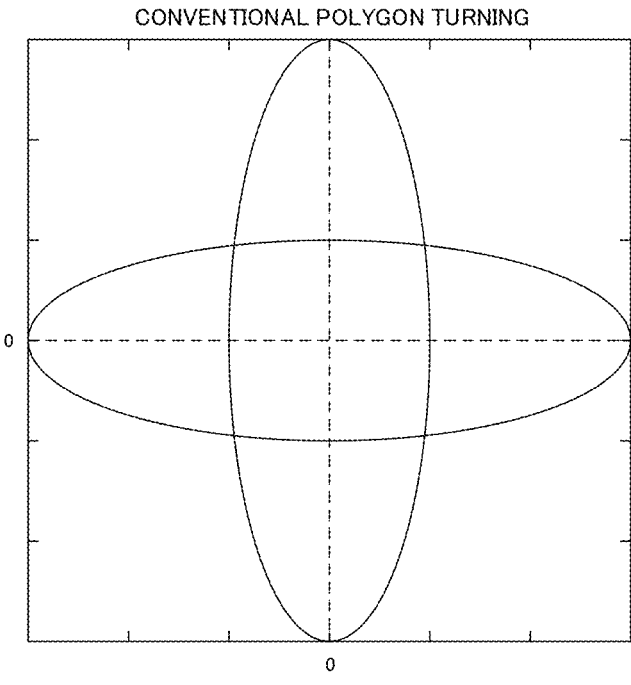
FIG. 9A is a diagram illustrating the flatness of a machining surface with the conventional polygon turning.
FIG. 9B is a diagram illustrating a change in the flatness of a machining surface caused by oscillation in the Y-axis directions.

The graphs illustrated in FIGS. 9A and 9B represent results when the above equation is calculated assuming that N=2, l=10, r=5, a=0.06, and ω=20π/3 (=200 rpm). It can be seen that the flatness of the machining surface of a quadrangle is improved in the polygon turning of the present disclosure (FIG. 9B) compared to the conventional polygon turning (FIG. 9A). The flatness of the machining surface can be changed by adjustment of the value of the adjustment parameter a. The adjustment parameter a may be set manually by an engineer, or the maximum value which does not make the machining surface concave may be derived from numerical analysis.

Modification of Machining Surface

Figures 10A, 10B:
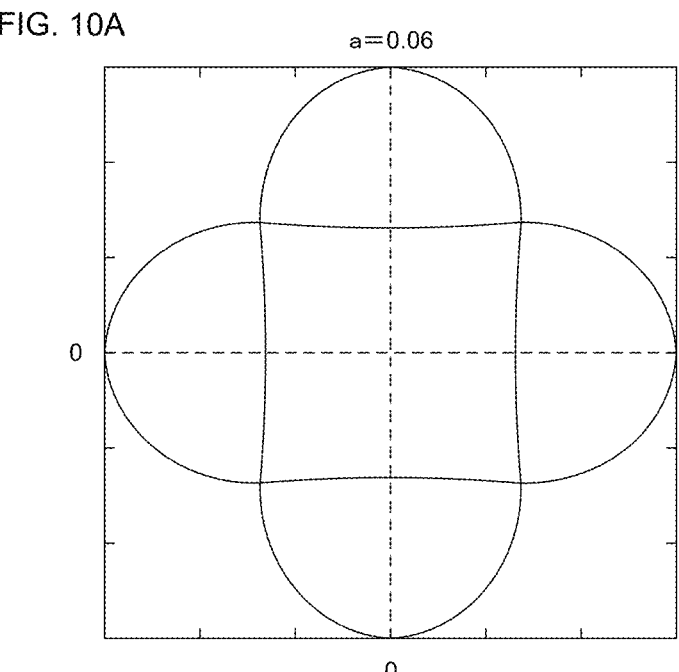
FIG. 10A is a diagram illustrating the shape of the machining surface when the adjustment parameter a is set to 0.06 in oscillation in the X-axis directions.
FIG. 10B is a diagram illustrating the shape of the machining surface when the adjustment parameter a is set to 0.15 in oscillation in the X-axis directions.

The graphs illustrated in FIGS. 10A and 10B represent how the machining surface changes in accordance with a change of the adjustment parameter a when the tool T is oscillated in the X-axis directions. If the tool T is oscillated in the X-axis directions under the condition of N=2, l=10, r=5, and ω=20π/3 (=200 rpm), the machining surface is made concave when the adjustment parameter a is set to 0.06 (FIG. 10A), and the machining surface is made more concave when the adjustment parameter a is set to 0.15 (FIG. 10B).

Figure 11A:
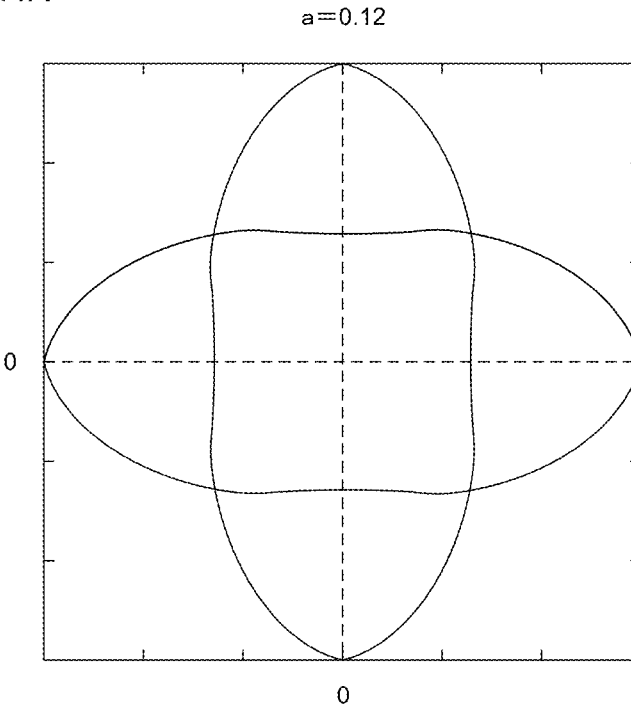
FIG. 11A is a diagram illustrating the shape of the machining surface when the adjustment parameter a is set to 0.12 in oscillation in the Y-axis directions.
Figure 11B:
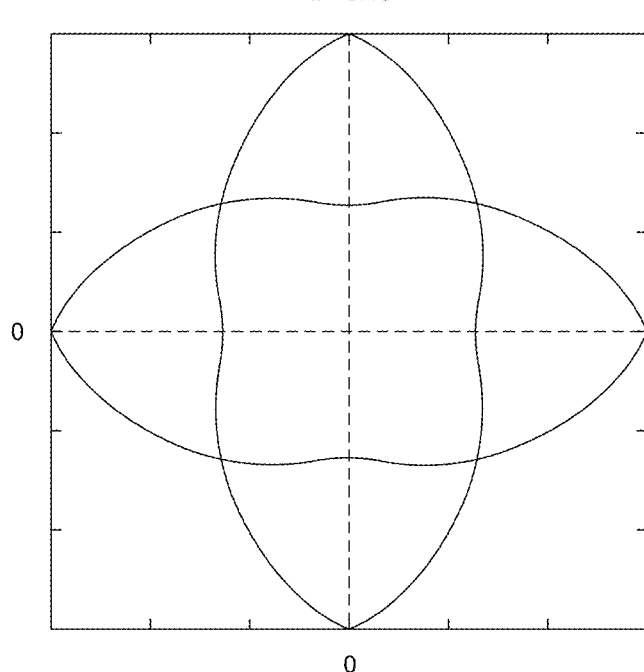
FIG. 11B is a diagram illustrating the shape of the machining surface when the adjustment parameter a is set to 0.18 in oscillation in the Y-axis directions.

The graphs illustrated in FIGS. 11A and 11B represent how the machining surface changes in accordance with a change of the adjustment parameter a when the tool T is oscillated in the Y-axis directions. The machining surface is made undulated and concave when the adjustment parameter a is set to 0.12 (FIG. 11A), and the machining surface is made more concave when the adjustment parameter a is set to 0.18 (FIG. 11B). The processed shape of the workpiece W changes in accordance with the value of the adjustment parameter a.

Adjustment Method of Machining Surface

Figure 12:
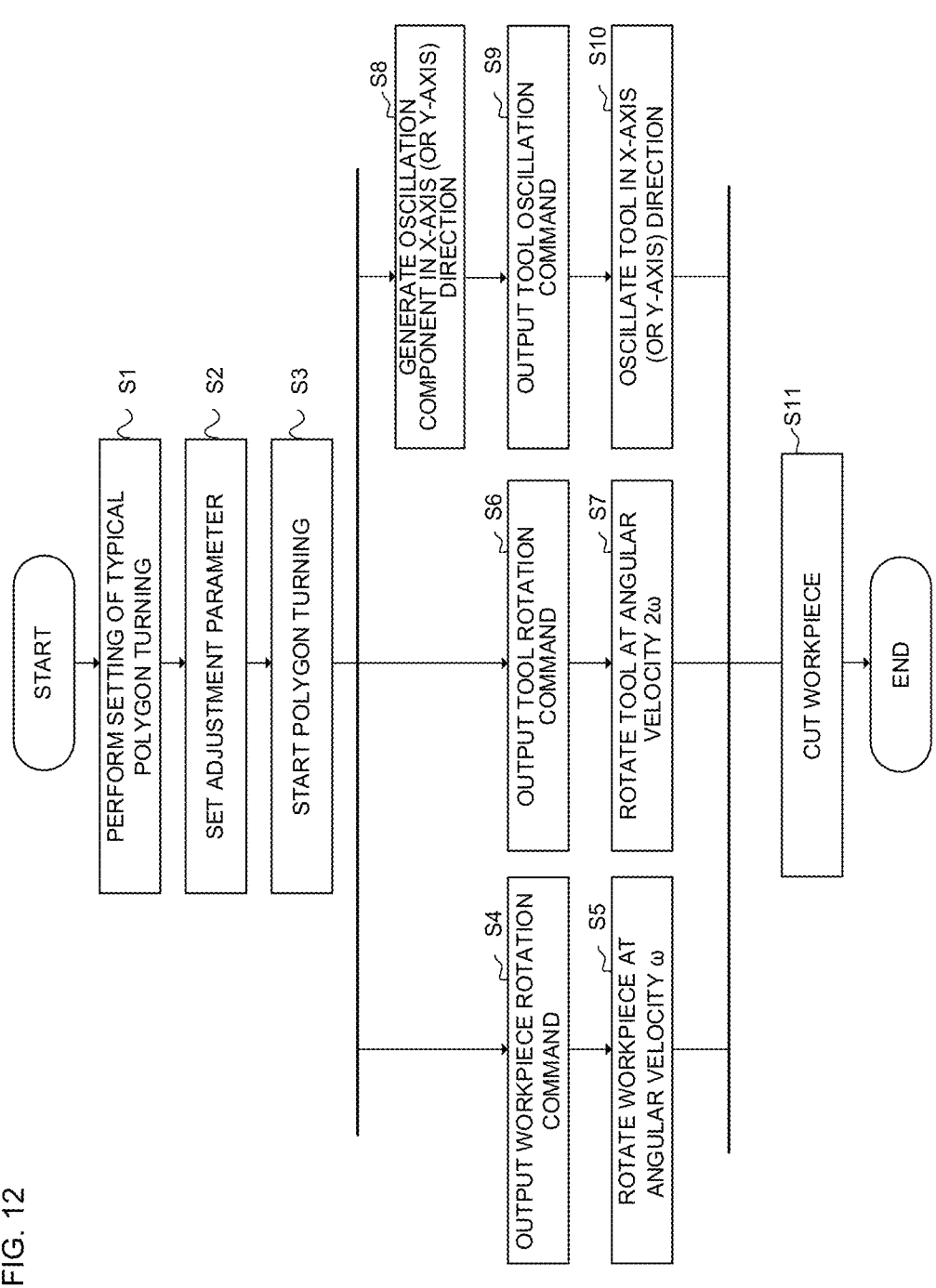
FIG. 12 is a flowchart illustrating a polygon turning method of the present disclosure.
Figure 13A:
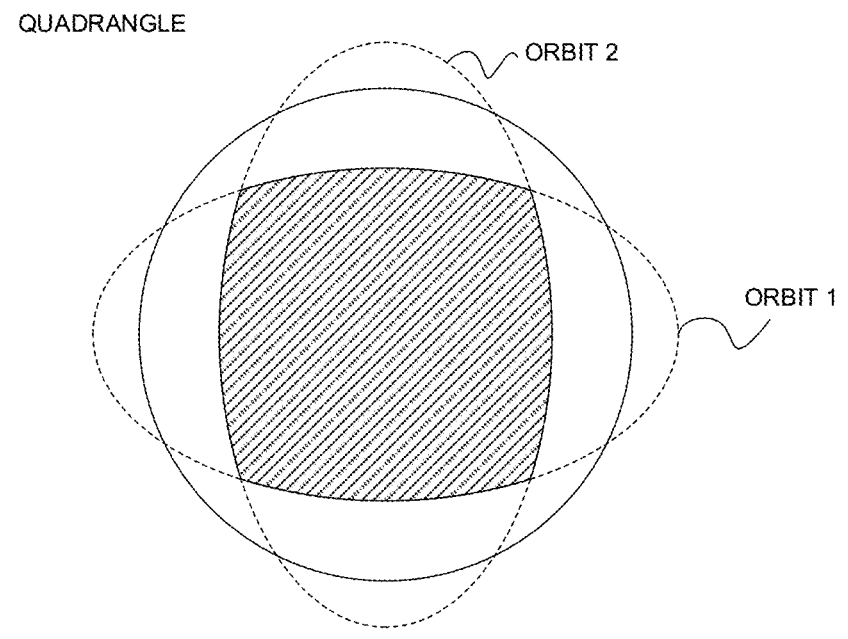
FIG. 13A is a diagram illustrating orbits of tools when a quadrangle is formed on a workpiece surface in the conventional polygon turning.
Figure 13B:
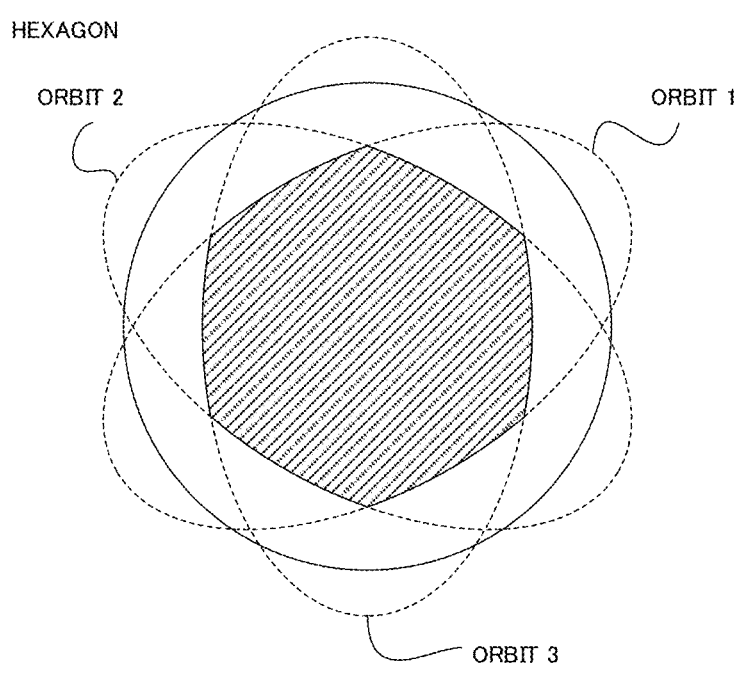
FIG. 13B is a diagram illustrating orbits of tools when a hexagon is formed on a workpiece surface in the conventional polygon turning.

An adjustment method in polygon turning of the present disclosure will be described with reference to the flowchart of FIG. 12. First, the workpiece W and the tool T are attached to the machine tool 200, and the distance between the rotation center of the workpiece W and the center of the tool rotation (l), the tool radius (r), the rotational rate of the workpiece W (ω), and the number of edges of the tool T (N) are input to the control device 100 (step S1). The operation so far is the same as the typical polygon turning.

Next, the adjustment parameter a is set (step S2). The engineer of the machine tool 200 observes the flatness of the machining surface while viewing the graph of the equations described above or the like and then sets a suitable adjustment parameter a to the control device. The adjustment parameter a may be manually set by an engineer, or the maximum value which does not make the machining surface concave may be derived from numerical analysis.

When the operator of the machine tool 200 provides a command to start polygon turning (step S3), the workpiece command generation unit 11 outputs a rotation command of the workpiece W to the spindle amplifier 161 (step S4). The spindle motor 162 rotates the workpiece W at a constant angular velocity ω in accordance with the control of the spindle amplifier 161 (step S5). At the same time, the tool command generation unit 12 outputs a rotation command of the tool shaft to the servo amplifier 140 (step S6). The tool rotating servo motor 151 rotates the tool shaft at a constant angular velocity 2ω in accordance with the control of the servo amplifier 140 (step S7).

The oscillation component generation unit 14 generates an oscillation component when oscillating the tool T in the X-axis directions (or the Y-axis directions) (step S8). The motion command generation unit 13 outputs an oscillation command of the tool T to the servo amplifier 140 (step S9).

The X-axis servo motor 153 (or the Y-axis servo motor 154) oscillates the cutter holder (tool T) in the X-axis directions (the Y-axis directions) in accordance with the control of the servo amplifier 140 (step S10). Polygon turning is performed while the tool T is oscillated on the X-axis (or the Y-axis), and thereby a polygon having adjusted flatness is formed on the workpiece surface (step S11).

In the first disclosure, the tool shaft for the polygon turning is oscillated in the X-axis directions. The oscillation range is 1 to 1+2×a×l, and the phase of the oscillation is adjusted so that the amplitude is the minimum when each tool edge reaches the center of the machining surface. With such oscillation of the tool T in the X-axis directions, it is possible to adjust how the machining surface is made concave or convex by adjusting the adjustment parameter a that is a coefficient of the oscillation range.

In the second disclosure, the tool shaft for the polygon turning is oscillated in the Y-axis directions. The oscillation range is −a×l to a×l, and the phase of the oscillation is adjusted so that the Y-axis component of the tool edge is zero when each tool edge reaches the center of the machining surface. With such oscillation of the tool T in the Y-axis directions, it is possible to adjust how the machining surface is made concave or convex by adjusting the adjustment parameter a that is a coefficient of the oscillation range.

Although a sine wave is used as an oscillation component in the first and second disclosure, an oscillation component other than a sine wave may be used. Further, although the rotation ratio between the workpiece W and the tool T is 1:2 in the first and second disclosure, the shape of the machining surface can be adjusted regardless of the rotation ratio.

Although one embodiment has been described above, the present invention is not limited to the disclosure described above and can be implemented in various forms with addition of a suitable change. For example, although the present disclosure is configured such that the workpiece shaft is the spindle shaft and the tool shaft is the servo shaft, polygon turning between spindles in which both the two shafts are the spindle shafts may be employed.

Further, although the tool shaft is oscillated in the X-axis directions (or the Y-axis directions) in the present disclosure, the workpiece shaft may be oscillated in the X-axis directions (or the Y-axis directions). As long as the relative distance between the tool shaft and the workpiece shaft changes, both the workpiece shaft and the tool shaft may be oscillated. Also, the tool shaft and the workpiece shaft may be oscillated simultaneously in the X-axis directions and the Y-axis directions.

Although the cases of a square and a regular hexagon have been described in the present disclosure, even when the formed shape is not a regular polygon, such a case is included in the present disclosure. For example, in a polygon cutter with two tools, when the phase difference between the tools is 90 degrees instead of 180 degrees, the workpiece shape will be a rhombus instead of a square. With such adjustment of a phase difference between tools, the present disclosure is also applicable to another shape such as a rhombus. In such a shape, the position where the oscillation component is the minimum or zero is not necessarily required to be the center of the machining surface, and an oscillation component for improving the flatness is suitably adjusted.

The invention claimed is:

1. A control device configured to control polygon turning to form a polygon on a surface of a workpiece by rotating the workpiece and a tool simultaneously, the control device comprising:

a processor configured to:

generate a command of an angular velocity of the workpiece; and generate a command of an angular velocity of the tool, wherein a relative distance between the workpiece and the tool is increased or decreased along a second axis line perpendicular to a first axis line connecting a center of the workpiece and a center of the tool so that a shape of a machining surface of the workpiece is adjusted, and
the processor is configured to
   generate an oscillation component so that the relative distance is minimum when an edge of the tool passes at or adjacent to a center of a machining surface of the polygon; and
   provide a command for increasing or decreasing the relative distance to use the oscillation component.

2. The control device according to claim 1, wherein
the oscillation component includes an adjustment parameter, and
the shape of the machining surface of the workpiece is changed in accordance with the adjustment parameter.

3. The control device according to claim 1, wherein
the oscillation component oscillates at a frequency of a multiple of the number of sides of the polygon with respect to the angular velocity of the workpiece.

4. The control device according to claim 1, wherein
shape adjustment performed on the machining surface includes increasing flatness.

* * * * *